2 Sheets—Sheet 1.

E. McC. STEVENSON.

Assignor to JOHN IRWIN.

Petroleum Well.

No. 8,287. Reissued June 18, 1878.

Witnesses
Henry Otto
W. H. Blair

Inventor
Elisha McCurdy Stevenson
by H. A. Doubleday
Atty

2 Sheets—Sheet 2.
E. McC. STEVENSON.
Assignor to JOHN IRWIN.
Petroleum Well.
No. 8,287. Reissued June 18, 1878.
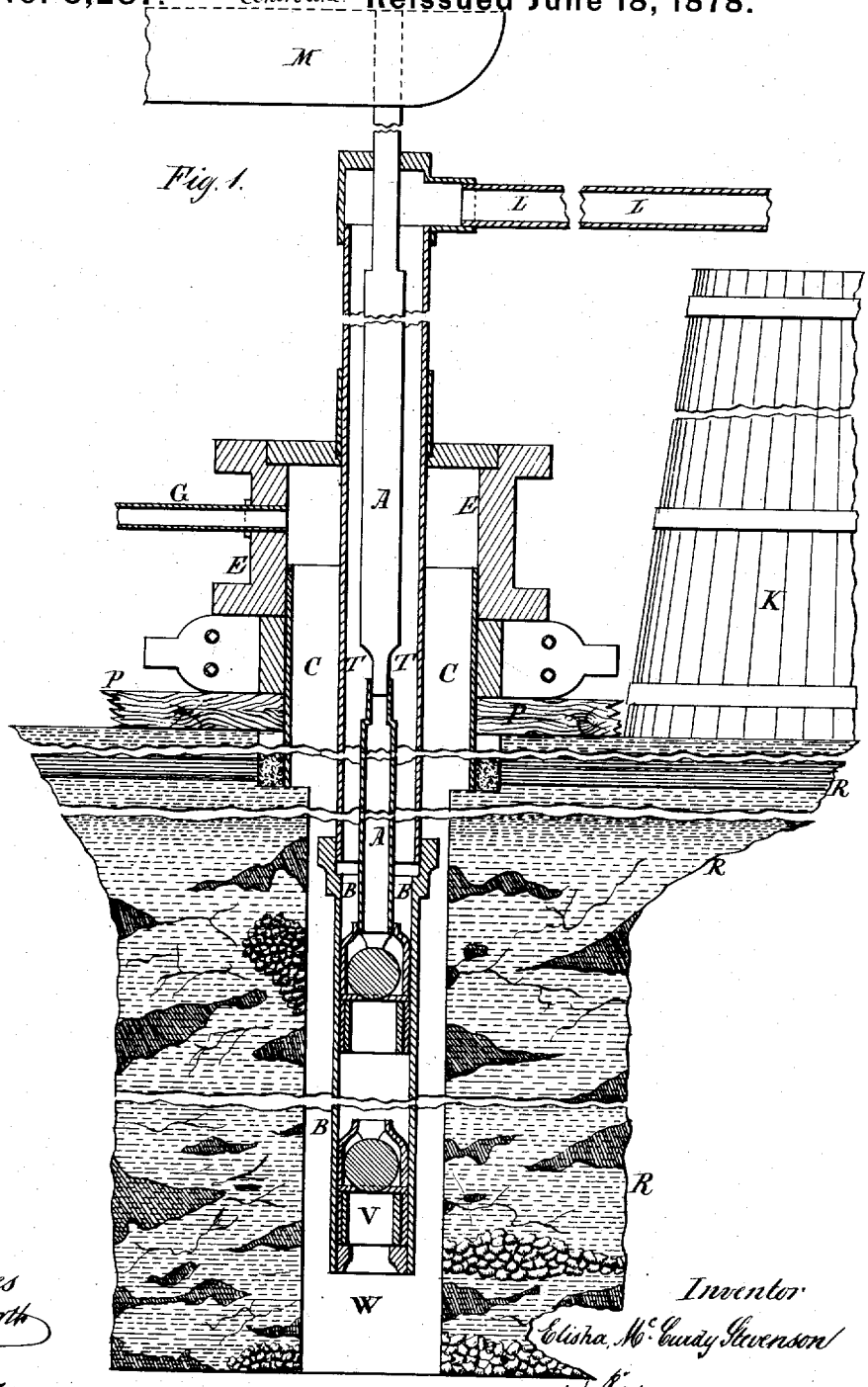
Witnesses
Henry Orth
W. W. Bliss
Inventor
Elisha McCurdy Stevenson
H. G. Dowlidon
Atty.

UNITED STATES PATENT OFFICE

ELISHA McCURDY STEVENSON, OF PULASKI, PENNSYLVANIA, ASSIGNOR TO JOHN IRWIN.

IMPROVEMENT IN PETROLEUM-WELLS.

Specification forming part of Letters Patent No. 155,119, dated September 15, 1874; Reissue No. 8,287, dated June 18, 1878; application filed February 26, 1878.

*To all whom it may concern:*

Be it known that I, ELISHA McCURDY STEVENSON, of Pulaski, Lawrence county, and State of Pennsylvania, have invented certain new and useful Improvements in Petroleum-Wells; and I do hereby declare that the following is a full, clear, and exact description thereof, that will enable others skilled in the art to which it appertains to make and use the same, reference being had to the accompanying drawings, and to the letters of reference marked thereon, which form a part of this specification.

The object of the first part of my invention is to dispense with the use of a pump in operating oil-wells.

The second part of the invention relates to devices for facilitating the withdrawal and replacing of the flowing-tube.

Figure 4:
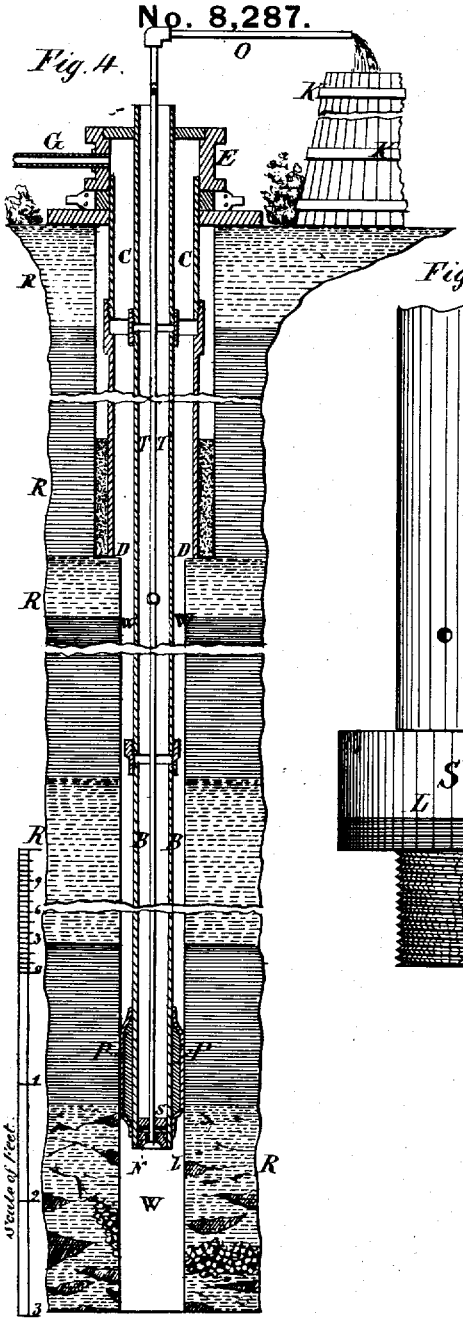
Figure 3:
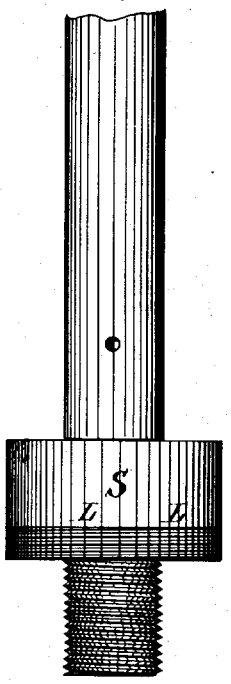
Figure 2:
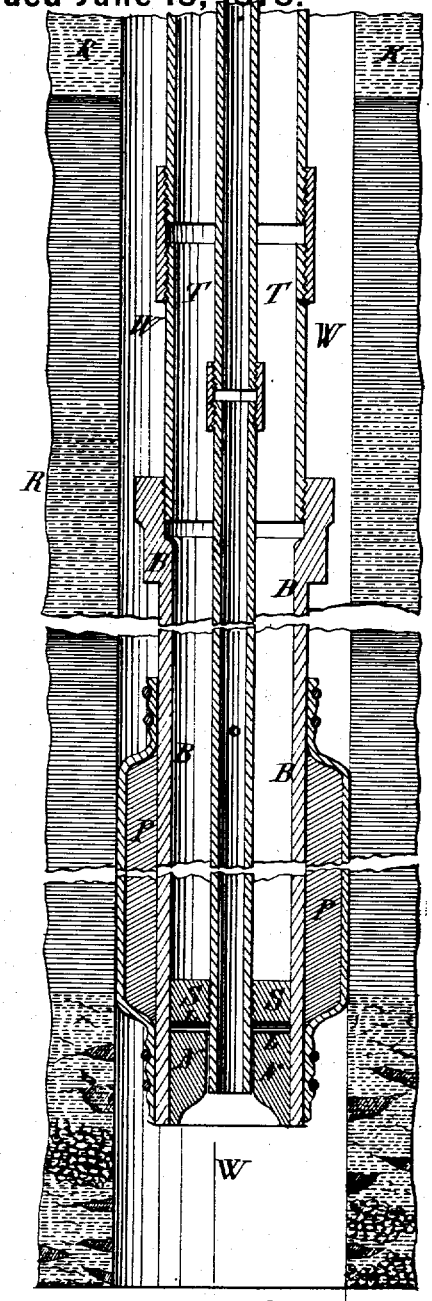

Figure 1 is a vertical section of an oil-well and eduction-tube of the ordinary construction. Fig. 2 is a vertical section of the lower part of a well having my invention applied thereto. Fig. 3 is a detached view, enlarged, of one of the devices employed by me; and Fig. 4 is a vertical section of a well arranged to flow under my method.

In the drawing, reference being particularly made to Fig. 1, R represents the rocks; W, the bore of the well penetrating into the oil-bearing rock; C, the casing usually employed for shutting off the fresh water at the point D; E, the casing-head, through an opening in which, at G, the gas usually escapes at the top of the well; T, the eduction-tube; B, the working-barrel; A, the pumping-rod; and H and V, the valves employed in pumping.

The gas naturally existing in the oil tends to separate from it as both enter the well, and to rise and escape at the top of the well at G; or, if intercepted by a packer placed in the usual way, it accumulates in the space between the packer and the top of the oil in the well, and there remains until relieved by the oil being pumped out, or until the gas, by its retroactive force, if strong enough, pressing upon the top of the oil, drives it as a dead-fluid up through the tube T to the top of the well.

Most wells, as now operated, are pumped from the beginning, and all are, I believe, before they are exhausted.

By means of my invention wells may be made to flow which would not do so by methods heretofore in use, and wells improved which sometimes might flow by other methods.

After the well has been provided with casing C in any usual or approved manner, thus shutting out such water as would otherwise enter above the point to which the lower end of the casing extends, I place a packer or other suitable appliance around the tube T, as in Figs. 2 and 4, so arranged and fitted as to prevent the oil and gas from rising above it, and so locate the packer that when in position it will be as near as practicable to, but above, the place where the petroleum enters the well.

I am aware that placing a packer around a pipe, so that the packer will be near the bottom of the well and will shut in the gas, is not new; but, using this or its equivalent, I add to this construction or combination of instrumentalities a casing or tube for shutting out or excluding water from the lower part of the well, and I make an opening in the discharge-tube as near as practicable to, but above, the place where the petroleum enters the well, or, what is equivalent, have the tube terminate at that point, thus also bringing the opening in the tube or its lower end below, but as near as practicable to, the packer above referred to. This construction substantially prevents a space into which the gas can rise or separate from the oil.

In case the tube T be of a suitable size or capacity relative to the quantity or yield of gas and oil, as hereinafter set forth, the oil will be discharged at the top of the well; but should it be found that the tube T is too large, I next take another tube, O, of the proper size, and screw or otherwise fasten it to a plate, S, of iron or other suitable material, about an inch thick, and of such diameter as to go inside the tube T. This flowing-tube O, I cause to terminate, when in position, just below the plate S, and as near to as practicable, but above, the place where the oil and gas enter the well.

The flowing-tube O and plate S thus arranged I let down into the tube T until the plate rests upon a shoulder or seat at or near the lower end of the tube T, as at N.

The shoulder or seat made for the standing valve or lower valve to rest upon may be used. This plate, by leather under it, or by other suitable means, is made to fit closely upon the seat N when in position, so that neither gas nor oil can rise above it outside of the flowing-tube O.

The flowing-tube is to be adapted to the oil and gas in the well or rock substantially as follows: The flowing-tube should be from one-fourth to one-half inch inside diameter for a well yielding up to about four barrels per day; to about twenty barrels, from one-half to three-fourths inch tube; to about fifty barrels, three-fourths to one-and-a-quarter-inch tube; to about one hundred barrels, one-and-a-quarter to one-and-a-half inch tube; above about one hundred barrels, one-and-a-half to two inch tube.

The space through which the gas and oil are to come up to the top of the well is thus readily adapted at any time to the gas and oil in the rock or well by drawing out one flowing-tube and putting in one smaller, as occasion requires, substantially as herein set forth.

From an examination of the above description and drawing it will be readily understood that by the employment of my invention the discharge of the oil from the well is greatly facilitated. Thus, if the casing C were not used, water would enter the well in such quantity as to necessitate the use of a pump for its removal, as such water would accumulate in the lower part of the well while the tubing and packer were being put in to such an extent as would, under ordinary circumstances, entirely prevent the discharge of oil by the action of the gas; and the presence of even a small quantity of water in the well is many times found to be injurious; but by the employment of my combination of casing, tubing, and packing a part of the delay, expense, and liability of injury to the well, which is incident to the presence of water in the oil-bearing portion, may be avoided, even though it be found desirable to remove the tube T and packer P.

The result of my invention is that the gas and oil rise up together through the flowing-tube, the gas being in a constantly-expanding condition, and bringing the oil with it to the top of the well. The action is similar to effervescence.

I do not, however, regard the use of the identical tube T, placed in the well for pumping, or the identical seat made for the standing valve, as essential to my process or invention, because another suitable outer tube, or another seat or its equivalent may be used. These are employed as being the most convenient and economical for the ordinary application of the invention. Neither are two tubes essential to success, as one tube and packer may be used, provided the lower end of the tube or an opening into it be located at the place mentioned for the termination of the flowing-tube O and the continuous space to the top of the well is adapted to the gas and oil in the rock or well, substantially as herein mentioned. Hence I do not wish to be limited to the use of the second tube or inner tube O, as it may be dispensed with and the gas and oil discharged through the outer tube T without departing from that part of my invention, which consists in the combination and arrangement of the casing C, the tube T, and the packer P; but I prefer the construction shown, because to draw out a tube and packer so as to change to another size of tube involves the risk of injuring a well by its being thus left open to the falling in of fluids and solids which accumulate above the packer, and also the injury of the well in various other ways.

It will be seen by an examination of the foregoing description and the drawing that the flowing-tube O may be withdrawn without admitting any water to the lower part of the well, because such water as may enter between the lower end of the casing and the packer or seed-bag will be excluded from the lower part of the well by means of the tube T and the seed-bag at its lower end; and it will also be seen that in case a well be constructed with the casing C and a single flowing-tube packed at or near its lower end, the casing will exclude from the lower part of the well such water as enters the bore of the well above the lower end of the casing, which water would enter the oil-bearing portion of the well, both before the flowing-tube and its packer are placed in position and during the removal and replacement of said flowing-tube and its packer, were it not for the combination of a casing with the said flowing-tube and packing. Thus it is apparent that under either of the constructions above provided for I use substantially the same combination of devices so far as relates to the function of the tube or casing in shutting water from the lower part of the well, because, if I use only the casing C and a single flowing-tube, the casing will still shut out a large portion of the water, which would otherwise run into the bottom of the well while I am engaged in putting down or taking out the discharging-tube; and in the construction in which I employ the two tubes shown in Figs. 2 and 4, extending down to the oil-bearing rock I exclude not only the fresh water, but the salt-water. Therefore, when I use in this patent the words "shutting out water from the lower part of the well," I do not wish to be understood as meaning that I thereby exclude all the water from the oil-producing part of the well.

I do not in this patent claim a process or method of making a well flow by extending a tube below or near to the bottom of the oil in a well, and so placing a packer that gas will escape from the oil into a space above it, and then, by its retroactive power and its pressure upon the top of the oil, drive the oil through the tube to the top of the well; nor do I in this patent claim, broadly, the idea, method, or process of causing an oil-well to flow by reducing the capacity of the discharging-tube, nor of arranging a packer at or near the bottom of the discharging-tube or at or near the upper line of the oil-producing rock, as these features form the subject-matter of another patent taken out by me; but What I do claim is—

1. The combination, in an oil-well, of a casing or tubing which excludes water from the lower part of the well, a tube through which oil is discharged from the well, and packing which prevents oil and gas from passing upward outside of the discharging-tube, substantially as set forth.

2. The combination of the flowing-tube O with the plate S, the seat N, and the tube T, or equivalents, substantially as set forth.

In testimony that I claim the foregoing I have hereunto set my hand this 14th day of February, 1878.

ELISHA McCURDY STEVENSON.

Witnesses:
D. L. TRAX,
M. E. WILLIAMS.